United States Patent [19]

Ono et al.

[11] Patent Number: 4,996,602
[45] Date of Patent: Feb. 26, 1991

[54] IMAGE-PROCESSING APPARATUS

[75] Inventors: Fumitaka Ono; Takayoshi Semasa, both of Kamakura, Japan

[73] Assignee: Mitsubishi Denki Kabushiki Kaisha, Tokyo, Japan

[21] Appl. No.: 355,345

[22] Filed: May 23, 1989

[30] Foreign Application Priority Data

May 23, 1988 [JP] Japan ............................... 63-126108

[51] Int. Cl.$^5$ ............................................... H04N 1/40
[52] U.S. Cl. .................................... 358/457; 358/455; 358/456
[58] Field of Search ............... 358/433, 448, 453, 455, 358/457, 462, 465, 466

[56] References Cited

U.S. PATENT DOCUMENTS

| | | | |
|---|---|---|---|
| 4,251,837 | 2/1981 | Jameway, III | 358/465 |
| 4,478,514 | 5/1988 | Bell . | |
| 4,529,220 | 10/1985 | Suzuki | 358/466 |
| 4,554,593 | 11/1985 | Fox et al. | 358/466 |
| 4,591,727 | 5/1986 | Gaebelein et al. . | |
| 4,686,579 | 8/1987 | Sakamoto | 358/457 |
| 4,709,274 | 11/1987 | Tanioka | 358/457 |
| 4,723,173 | 2/1988 | Tanioka | 358/465 |
| 4,742,399 | 5/1988 | Kitamura | 358/466 |

OTHER PUBLICATIONS

"Bilevel Rendition Method for Documents Including Gray-Scale and Bilevel Image", *UDC* 621,397.12: (741 & 7703), Nobuji Tetsutani and Hiroshi Ochi.

"A Survey of Electronic Techniques for Pictorial Image Reproduction", *IEEE Transactions on Communications*, vol. Co. 29, No. 12, Dec. 1981, J. C. Stoffel and J. F. Moreland.

*Primary Examiner*—James J. Groody
*Assistant Examiner*—Kim Yen Vu

[57] ABSTRACT

An input gray-scale image is converted to a bilevel output signal by an image-processing apparatus with two binarizing circuits: one employing a uniform threshold and the other a dither matrix. The outputs of these circuits are selected for each pixel by deciding whether the pixel is a bilevel pixel or a gray-scale pixel. The decision is based on the maximum and minimum gray levels in a block of pixels centered on the pixel in question. Images having both bilevel and gray-scale parts can thus be binarized with clean reproduction of black-white edges.

30 Claims, 4 Drawing Sheets

IMAGE-PROCESSING APPARATUS

BACKGROUND OF THE INVENTION

This invention relates to an image-processing apparatus for converting an input image with multiple gray levels to a bilevel output signal consisting of black and white dots, more particularly to such an apparatus that converts a page consisting of texts and gray-scale images into bilevel output with clean edge reproduction.

In scanning devices such as facsimile machines, a variety of schemes have been used to convert photographs and other images with multiple gray levels to bilevel output images having only two levels: black and white. A simple method is to binarize the input image against a fixed threshold, converting levels of gray that equal or exceed the threshold to black and other levels to white. Such uniform thresholding is highly unsatisfactory, because it completely fails to represent continuous shades of gray and results in great loss of detail.

A widely adopted alternative method is to dither the thresholds by varying them at individual pixel positions. This is normally done with a dither matrix such as a four-by-four matrix of threshold values, which is applied to four-by-four pixel blocks in a repeated manner to cover the entire input image. Such dithering can reproduce gray-scale images with considerable success. When the input image comprises bilevel portions such as line graphics and text, however, dithering creates unwanted effects such as blurred or serrated edges.

A prior-art solution to this problem, known as the block adaptive thresholding method, is to identify blocks of pixels as either bilevel or gray-scale in nature and apply a fixed threshold or dither matrix accordingly, as described in the paper "Bilevel Rendition Method for Documents including Gray-Scale and Bilevel Image" by N. Tetsutani and H. Ochi in *The Transactions of the Institute of Electronics and Communication Engineers of Japan*. Vol. J67-B No. 7, July 1984 (in Japanese).

A problem in this prior-art solution is that blocks may be mis-identified. In particular, when an all-white block is disposed next to an all-black block, both blocks may be mistakenly identified as gray-scale blocks, so some blurring of edges still occurs.

SUMMARY OF THE INVENTION

An object of the present invention is accordingly to reproduce black-white edges cleanly by correctly identifying them as bilevel in nature.

An image-processing apparatus according to this invention comprises a gray-scale image memory for storing an input image, a maximum-minimum detection circuit for testing blocks centered on the individual pixels of the image and finding the maximum and minimum gray levels therein, a decision circuit for deciding therefrom whether each pixel is a gray-scale pixel or a bilevel pixel, a uniform-threshold binarizing circuit for thresholding the image against a uniform threshold, a dither-matrix binarizing circuit for thresholding the image using a dither matrix, and a switch, controlled by a control signal from the decision circuit, for selecting the output of the uniform-threshold binarizing circuit or the output of the dither-matrix binarizing circuit.

The method employed by this image-processing apparatus is to threshold bilevel pixels against a uniform threshold and gray-scale pixels using a dither matrix, deciding for each pixel individually whether it is a gray-scale or bilevel pixel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 shows an example of gray levels encountered at the edge of a character;

FIG. 4 shows an example of a four-by-four dither matrix;

FIG. 5 shows the result of thresholding the image in FIG. 3 with the dither matrix in FIG. 4;

FIG. 6 shows the result of thresholding the image in FIG. 3 with a uniform threshold;

FIG. 7 shows the results of the decisions made by the decision circuit in FIG. 1 for the image in FIG. 3;

FIG. 8 shows the bilevel output signal thus generated from the image in FIG. 3;

FIG. 9 shows the decisions made by the prior-art block adaptive thresholding method; and FIG. 10 shows the bilevel output signal thus generated from the input image in FIG. 3.

DETAILED DESCRIPTION OF THE EMBODIMENTS

A novel image-processing apparatus embodying the present invention will be described with reference to the drawings.

Figure 1:
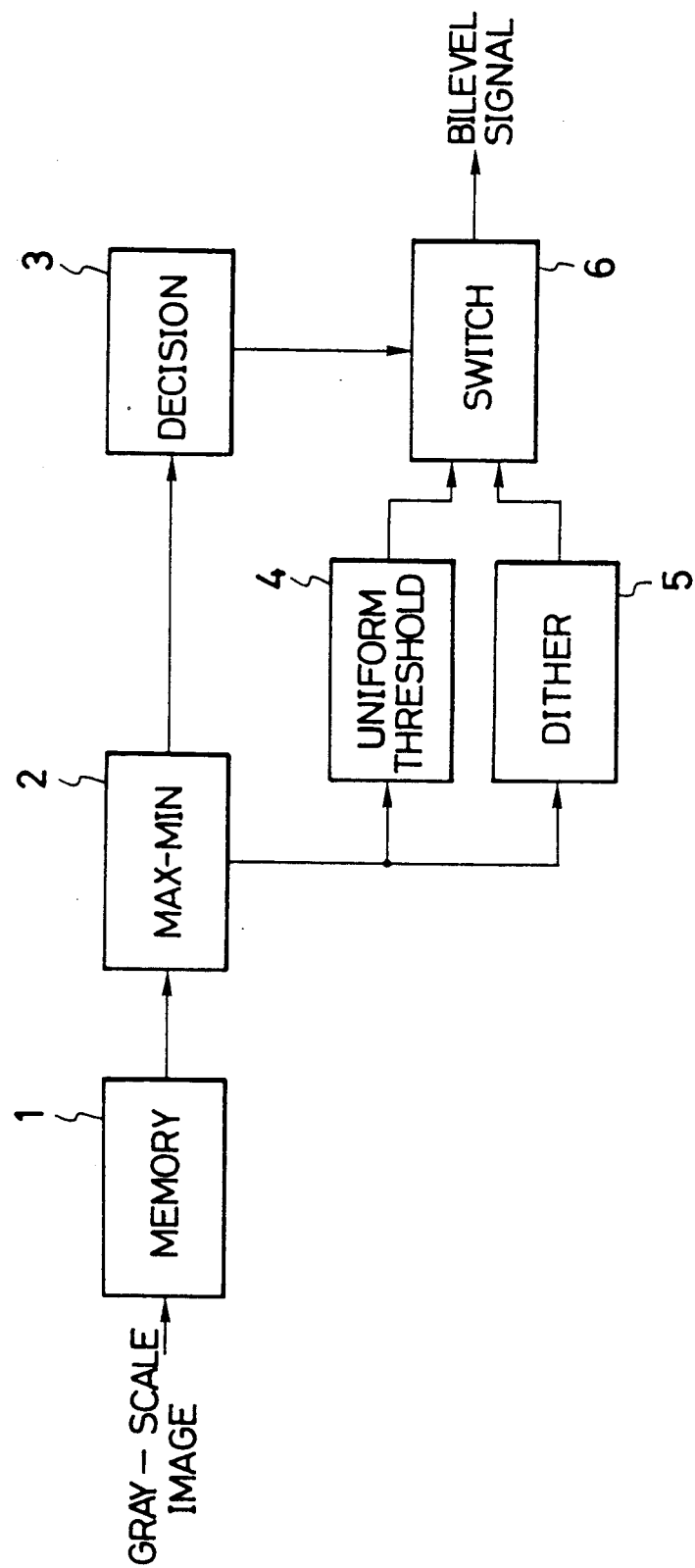
FIG. 1 is a block diagram of a novel image-processing apparatus.

FIG. 1 is a block diagram of the novel image-processing apparatus, which receives an input image comprising pixels with multiple gray levels and converts it to a bilevel output signal comprising pixels with only the two levels black and white.

The input image is stored in a gray-scale image memory 1, from which it is read by a maximum-minimum detection circuit 2. For each pixel in the image, the maximum-minimum detection circuit 2 identifies the maximum and minimum gray levels in a block centered on that pixel and supplies these maximum and minimum levels to a decision circuit 3. The maximum-minimum detection circuit 2 also passes the image signal to a pair of binarizing circuits: a uniform-threshold binarizing circuit 4 and a dither-matrix binarizing circuit 5.

The decision circuit 3 calculates the difference between the maximum and minimum values obtained from the maximum-minimum detection circuit 2, decides therefrom whether each pixel is a bilevel pixel or a gray-scale pixel, and generates a control signal that controls a switch 6 according to the decision result.

The uniform-threshold binarizing circuit 4 binarizes the input image against a uniform threshold, thus generating a first bilevel signal which it sends to the switch 6.

The dither-matrix binarizing circuit 5 binarizes the input image using a dither matrix, which may be one of the well-known dither matrices employed in the prior art. It thus generates a second bilevel signal which it sends to the switch 6.

For each pixel, the switch 6 selects either the first bilevel signal received from the uniform-threshold binarizing circuit 4 or the second bilevel signal received from the dither-matrix binarizing circuit 5 according to the control signal received from the decision circuit 6. The selected bilevel signal becomes the bilevel output signal of the image-processing apparatus.

The decision circuit 3, the uniform-threshold binarizing circuit 4, and the dither-matrix binarizing circuit 5 have synchronizing means such as buffer memories, not shown in the drawing, for assuring that the first bilevel signal, the second bilevel signal, and the control signal for a given pixel arrive at the switch 6 simultaneously. The maximum-minimum detection circuit 2 also has a buffer memory for storing pixels read from the gray-scale image memory 1.

The operation of the novel image-processing apparatus will be described with reference to FIGS. 2 to 8. In these drawings the input image signal has sixteen gray levels per pixel, and the blocks tested by the maximum-minimum detection circuit 2 are three pixels by three pixels in size. The decision circuit 3 decides that a given pixel is a gray-scale pixel if the difference between the maximum and minimum values received from the maximum-minimum detection circuit 2 is less than a certain value, and a bilevel pixel if the difference is equal to or greater than that value. The value in this case is the middle gray level of eight. The uniform threshold employed by the uniform-threshold binarizing circuit 4 is also the middle gray level of eight; that is, gray levels less than eight are converted to white, and gray levels equal to or greater than eight are converted to black. The dither matrix employed by the dither-matrix binarizing circuit 5 is a four-by-four matrix.

Figure 2:
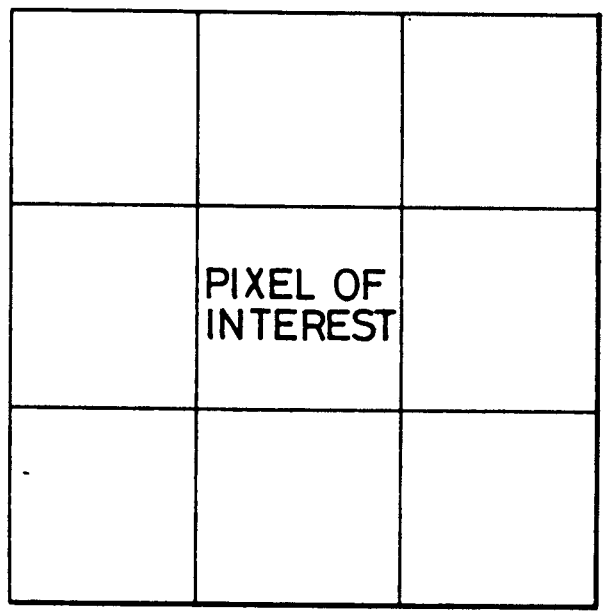
FIG. 2 is a drawing of a block tested by the maximum-minimum detection circuit in FIG. 1.

FIG. 2 shows the three-by-three block tested by the maximum-minimum detection circuit 2. The pixel of interest is at the center. The maximum-minimum detection circuit 2 finds the maximum and minimum gray levels occurring among nine pixels: the pixel of interest and its eight neighboring pixels.

FIG. 3 shows an example of the gray levels produced by a facsimile scanner or other scanning device at the edge of a black character on a white background. Black is represented by the gray level sixteen, and white by the gray level one. Due to integration effects in the scanner, the gray level does not change abruptly from sixteen to one, but passes through intermediate levels of fourteen and eight.

FIG. 4 shows the four-by-four dither matrix used by the dither-matrix binarizing circuit 5 to convert this gray-scale image to a bilevel signal. The matrix comprises sixteen threshold values. The same matrix is used repeatedly. Each threshold in FIG. 4 is applied to the pixel in the corresponding position in FIG. 3, as indicated by the ruled lines.

FIG. 5 shows the result of applying this dither matrix to the image in FIG. 3, the value 0 representing white and the value 1 black. The edge is blurred: there are two black pixels to the left of the center line, and one white pixel to the right.

FIG. 6 shows the result of binarizing the image in FIG. 3 with a uniform threshold of eight, as is done by the uniform-threshold binarizing circuit 4. This time the edge is clean.

FIG. 7 shows the results of the decisions made by the decision circuit 3 for the image in FIG. 3. The letter C represents a bilevel pixel and the letter P a gray-scale pixel. In the first two columns in FIG. 3, the maximum and minimum values in the three-by-three blocks around each pixel are both one, so their difference is zero, hence these pixels are determined to be gray-scale pixels. In the third column the maximum-minimum difference is seven, which is less than eight, so these pixels are also determined to be gray-scale pixels. In the fourth column the maximum-minimum difference is thirteen, and in the fifth column it is eight; the pixels in these two columns are determined to be bilevel pixels. In the sixth through eighth columns the maximum-minimum difference is two or zero, so these pixels are determined to be gray-scale pixels.

FIG. 8 shows the bilevel output signal generated by the novel image-processing apparatus from the input image in FIG. 3. In the outer six columns the second bilevel signal from the dither-matrix binarizing circuit 5 is selected, so in these six columns FIG. 7 is identical to FIG. 5. In the middle two columns the first bilevel signal from the uniform-threshold binarizing circuit 4 is selected, so in these two columns FIG. 7 is identical to FIG. 6. As a result of making these decisions for each individual pixel, the same clean edge is achieved as in FIG. 6.

It may be noted that the identification of the pixels in the outer six columns as gray-scale pixels in FIG. 7 is incorrect; all of the pixels should actually be bilevel pixels. Away from the edge, however, the pixels in FIG. 3 all have either the maximum or the minimum gray level, so all will be converted to black or white correctly regardless of whether the uniform threshold or dither matrix is used. The gray-scale/bilevel decision thus becomes irrelevant in non-edge regions. What is essential is that black-white edge pixels be identified correctly as bilevel pixels.

For comparison, FIG. 9 shows the decisions made by the prior-art block adaptive thresholding method. In this method a single decision is made for an entire block covered by the dither matrix. In the block on the left, the maximum-minimum gray-level difference is seven; in the block on the right it is two. Both blocks are therefore judged to be gray-scale blocks, and the output of the dither-matrix binarizing circuit 5 is selected for all pixels. The output signal is therefore as shown in FIG. 10, having the edge blurring noted in FIG. 5.

The method of converting an input image to a bilevel output signal employed in the novel image-processing apparatus can be stated as follows. For each pixel, a block centered on that pixel is tested to find the maximum and minimum gray levels therein. From these maximum and minimum values, a decision is made as to whether each pixel is a gray-scale pixel or a bilevel pixel. If it is a bilevel pixel, it is thresholded against a uniform threshold. If it is a gray-scale pixel, it is thresholded using a dither matrix. An advantage of this method is that by making the bilevel/gray-scale decision for each pixel individually, instead of for blocks of pixels as in the prior art, it avoids blurring effects caused by the coincidence of the edge of a block with a black-white edge in the input image.

A further advantage of the novel image-processing apparatus is that since the maximum-minimum detection circuit 2 tests three-by-three blocks instead of four-byfour blocks, it does not have to store as many pixel values as in the prior art. The maximum-minimum detection circuit 2 reads the image signal from the gray-scale image memory 1 a scan line at a time. Efficient computational methods require the maximum-minimum detection circuit 2 to store the gray-level values for only two scan lines at a time in its buffer memory, while in the prior art storage of three scan lines was necessary.

A similar advantage is that since the gray-scale/bilevel decision is made for each pixel, the bilevel output signal can be furnished a line at a time, while in the prior art, in which the decision was made for four-by-four blocks, it was necessary to store four lines in an output buffer memory.

The scope of this invention is not restricted to the embodiment shown in the drawings, but includes many modifications which will be apparent to one skilled in the art. For example, the number of gray levels in the input image signal can be other than sixteen, the blocks tested by the maximum-minimum detection circuit 2 can be larger than three by three pixels in size, the threshold level employed by the uniform-threshold binarizing circuit 4 can be other than the middle gray level, and the dither matrix employed by the dither-matrix binarizing circuit 5 can be other than the one shown in FIG. 4.

The gray-scale/bilevel decision made by the decision circuit 3 can furthermore be based not only on the difference between the maximum and minimum values in a block but also on the values themselves. For example, a rule such as the following can be used: a pixel can be judged to be a bilevel pixel if the maximum-minimum difference in its block is greater than seven, or if the difference is equal to seven and the minimum value is one or two, or if the difference is equal to six and the minimum value is one.

What is claimed is:

1. An image-processing apparatus for converting an input image having pixels with multiple gray levels to a bilevel output signal, comprising:
    gray-scale image memory means for storing said input image;
    maximum-minimum detection means for reading said stored input image from said gray-scale image memory means, testing respective blocks of plural pixels centered on respective pixels of said stored input image, finding the maximum and minimum gray levels therein, and furnishing said maximum and minimum gray levels as output;
    decision means for receiving said maximum and minimum gray levels, deciding therefrom whether respective pixels are gray-scale pixels or bilevel pixels, and generating a control signal accordingly;
    uniform-threshold binarizing means for receiving said stored input image read by said maximum-minimum detection means, thresholding it against a uniform threshold, and thereby generating a first bilevel signal;
    dither-matrix binarizing means for receiving said stored input image read by said maximum-minimum detection means, thresholding it using a dither matrix, and thereby generating a second bilevel signal; and
    switch means for selecting said first bilevel signal or said second bilevel signal, according to said control signals, as said bilevel output signal.

2. The image-processing apparatus of claim 1, wherein said decision means decides whether a pixel is a gray-scale pixel or bilevel pixel according to whether the difference between said maximum and minimum gray levels is less than a certain value or not.

3. The image-processing apparatus of claim 2, wherein said certain value is the middle gray level.

4. The image-processing apparatus of claim 1, wherein said uniform threshold is the middle gray level.

5. The image-processing apparatus of claim 1, wherein the size of said respective blocks tested by said maximum-minimum detection means is three pixels by three pixels.

6. A method of converting an input image having pixels with multiple gray levels to a bilevel output signal, comprising the steps of:
    testing respective blocks of plural pixels centered on respective pixels in said input image and finding the maximum and minimum gray levels therein;
    deciding from said maximum and minimum gray levels whether each respective pixel is a gray-scale pixel or a bilevel pixel;
    threshold a respective pixel against a uniform threshold if said respective pixel is decided to be a bilevel pixel to generate a first bilevel signal as said bilevel output signal; and
    thresholding a respective pixel using a dither matrix if said respective pixel is decided to be a gray-scale pixel to generate a second bilevel signal s said bilevel output signal.

7. The method of claim 6, wherein a pixel is decided to be a gray-scale or bilevel pixel according to whether the difference between said maximum and minimum gray levels is less than a certain value or not.

8. The method of claim 7, wherein said certain value is the middle gray level.

9. The method of claim 6, wherein said uniform threshold is the middle gray level.

10. The method of claim 6, wherein the size of said respective blocks tested is three pixels by three pixels.

11. An image-processing apparatus for converting an input image having pixels with multiple gray levels to a bilevel output signal, comprising:
    gray-scale image memory means for storing said input image;
    maximum-minimum detection means for reading said stored input image from said gray-scale image memory means, for each respective pixel therein finding maximum and minimum gray levels in a block of plural pixels centered on and including said respective pixel, and furnishing said maximum and minimum gray levels as output;
    decision means for receiving said maximum and minimum gray levels, deciding therefrom whether respective pixels are gray-scale pixels or bilevel pixels, and generating a control signal accordingly;
    uniform-threshold binarizing means for receiving said stored input image read by said maximum-minimum detection means, thresholding it against a uniform threshold, and thereby generating a first bilevel signal;
    dither-matrix binarizing means for receiving said stored input image read by said maximum-minimum detection means, thresholding it using a dither matrix, and thereby generating a second bilevel signal; and
    switch means for selecting said first bilevel signal or said second bilevel signal, according to said control signal, as said bilevel output signal.

12. The image-processing apparatus of claim 11, wherein said decision means decides whether a pixel is a gray-scale pixel or bilevel pixel according to whether the difference between said maximum and minimum gray levels is less than a certain value or not.

13. The image-processing apparatus of claim 11, wherein the block of plural pixels tested by said maximum-minimum detection means is three by three pixels.

14. The image-processing apparatus of claim 12, wherein said certain value is the middle gray level.

15. The image-processing apparatus of claim 11, wherein said uniform threshold is the middle gray level.

16. A method of converting an input image having pixels with multiple gray levels to a bilevel output signal, comprising the steps of:
testing each respective pixel in said input image for finding maximum and minimum gray levels in a block of plural pixels centered on and including said respective pixel;
deciding from said maximum and minimum gray levels whether each respective pixel is gray-scale pixel or a bilevel pixel;
thresholding a respective pixel against a uniform threshold if said respective pixel is decided to be a bilevel pixel to generate a first bilevel signal as said bilevel output signal; and
thresholding a respective pixel using a dither matrix if said respective pixel is decided to be a gray-scale pixel to generate a second bilevel signal as said bilevel output signal.

17. The method of claim 16, wherein a pixel is decided to be a gray-scale or bilevel pixel according to whether the difference between said maximum and minimum gray levels is less than a certain value or not.

18. The method of claim 16, wherein the block of plural pixels tested is three pixels by three pixels.

19. The method of claim 17, wherein said certain value is the middle gray level.

20. The method of claim 16, wherein said uniform threshold is the middle gray level.

21. An image processing apparatus comprising:
maximum-minimum detection means for testing each respective pixel with a block of plural pixels centered on and including said respective pixel to generate and output maximum and minimum gray levels for each respective pixel of a stored image of multiple gray levels;
decision means, coupled to and receiving said maximum and minimum gray levels, for determining therefrom whether each respective pixel is a gray-scale pixel or a bilevel pixel and for outputting a decision signal indicative thereof; and
binarizing means, coupled to and receiving said decision signal, for thresholding a respective pixel against a uniform threshold if the respective pixel is a bilevel pixel and for thresholding a respective pixel using a dither matrix if the respective pixel is a gray-scale pixel, to generate a bilevel output signal.

22. The image processing apparatus of claim 21 wherein the block of plural pixels tested is three pixels by three pixels.

23. The image processing apparatus of claim 21 wherein said decision means decides whether a pixel is a gray-scale pixel or a bilevel pixel according to whether the difference between said maximum and minimum gray levels is less than a certain value or not.

24. The image processing apparatus of claim 23 wherein said certain value is the middle gray level.

25. The image processing apparatus of claim 21 wherein said uniform threshold is the middle gray level.

26. A method of image processing comprising the steps of:
testing each respective pixel and a block of plural pixels centered on and including said respective pixel to generate and output maximum and minimum gray levels for each respective pixel of a stored image of multiple gray levels;
determining in response to said maximum and minimum gray levels, whether each respective pixel is a gray-scale pixel or a bilevel pixel and outputting a decision signal indicative thereof; and
binarizing a respective pixel against a uniform threshold if the respective pixel is a bilevel pixel and binarizing a respective pixel using a dither matrix if the respective pixel is a gray-scale pixel, to generate a bilevel output signal.

27. The method of image processing of claim 26 wherein the block of plural pixels tested is three pixels by three pixels.

28. The method of image processing of claim 26 wherein said determining step comprises deciding whether a pixel is a gray-scale pixel or a bilevel pixel according to whether the difference between said maximum and minimum gray levels is less than a certain value or not.

29. The method of image processing of claim 28 wherein said certain value is the middle gray level.

30. The method of image processing of claim 26 wherein said uniform threshold is the middle gray level.

* * * * *